(12) United States Patent
Buchmann et al.

(10) Patent No.: US 11,353,314 B2
(45) Date of Patent: Jun. 7, 2022

(54) METHOD FOR DETERMINING A DISTANCE BETWEEN TWO COMPONENTS TO BE JOINED

(71) Applicants: AIRBUS DEFENCE AND SPACE GMBH, Taufkirchen (DE); AIRBUS OPERATIONS GMBH, Hamburg (DE)

(72) Inventors: Christopher Buchmann, Munich (DE); Alois Friedberger, Oberpframmern (DE); Thomas Kruse, Hermannsburg (DE); Thomas Körwien, Höhenkirchen (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 420 days.

(21) Appl. No.: 16/002,838

(22) Filed: Jun. 7, 2018

(65) Prior Publication Data

US 2018/0356201 A1    Dec. 13, 2018

(30) Foreign Application Priority Data

Jun. 8, 2017   (DE) .......................... 102017112606.6

(51) Int. Cl.
*G01B 7/14*     (2006.01)
*G01B 7/06*     (2006.01)

(52) U.S. Cl.
CPC ................ *G01B 7/14* (2013.01); *G01B 7/06* (2013.01)

(58) Field of Classification Search
CPC . G01B 7/14; G01B 7/06; G01N 22/04; G01N 27/225; G01N 27/24; G01N 2291/0231; B29C 35/0288; B64F 5/60
See application file for complete search history.

(56) References Cited

U.S. PATENT DOCUMENTS 5,245,293 A * 9/1993 Runner ................ G01N 27/225
                                                            156/64
5,247,261 A * 9/1993 Gershenfeld ............ G10H 1/00
                                                            324/716
(Continued)

OTHER PUBLICATIONS

Obaid et al., titled "A Time-domain Reflectometry Method for Automated measurement of Crack Propagation in Composites during Mode I DCB Testing", No. 22/2006, Sage Publications, Journal of Composite Materials, vol. 40, pp. 2047-2066. (Year: 2006).*

*Primary Examiner* — Patrick Assouad
*Assistant Examiner* — Haidong Zhang
(74) *Attorney, Agent, or Firm* — Greer, Burns & Crain, Ltd.

(57) ABSTRACT

A method for determining a distance between components has the steps of providing a first conductive section in or on the first component in a region directed toward the second component, providing a second conductive section in or on the second component in a region directed toward the first conductive section, feeding a first voltage pulse into a first connection of the first conductive section, capturing a reflection voltage pulse in response to the first voltage pulse at the first connection, determining an impedance profile along the first conductive section by evaluating the reflection voltage pulse, and determining a distance between the components along the first conductive section by calculating a corresponding local distance, associated with the determined impedance profile, between the first conductive section and the second conductive section.

14 Claims, 5 Drawing Sheets

(56) References Cited

U.S. PATENT DOCUMENTS

| | | | | |
|---|---|---|---|---|
| 5,376,888 A | * | 12/1994 | Hook | G01N 22/04 |
| | | | | 324/533 |
| 6,617,557 B1 | * | 9/2003 | Ryan | B29C 65/3676 |
| | | | | 219/634 |
| 8,598,892 B2 | * | 12/2013 | Bach | G01B 7/14 |
| | | | | 324/658 |
| 2007/0108490 A1 | * | 5/2007 | Tan | H01G 4/20 |
| | | | | 257/296 |
| 2007/0214623 A1 | * | 9/2007 | Lee | G01N 29/045 |
| | | | | 29/25.35 |
| 2018/0042556 A1 | * | 2/2018 | Shahparnia | A61B 5/6892 |
| 2018/0328895 A1 | * | 11/2018 | Brelati | G01N 29/07 |

\* cited by examiner

METHOD FOR DETERMINING A DISTANCE BETWEEN TWO COMPONENTS TO BE JOINED

TECHNICAL FIELD

The disclosed embodiments of the invention relate to a method for determining a distance between a first component and a second component to be joined to one another. The disclosed embodiments also relate to a system for determining such a distance and to the use of a time domain reflectometry method for determining such a distance.

BACKGROUND

When joining two parts, in particular large-sized parts, which have been produced from a fiber composite material or a metallic material, for example, by means of adhesive bonding or other joining methods, it may be desirable to determine the thickness of the cured adhesive. The adhesive thickness influences the strength of the join, with the result that it is advantageous to verify the correct adhesive thickness. However, with known methods, it is largely impossible to determine the thickness of the adhesive layer in a non-destructive manner.

BRIEF SUMMARY

An object of the disclosure is consequently to propose a method and a system for determining an adhesive thickness between two components to be adhesively bonded to one another or the distance between them, which method can be carried out in a precise, non-destructive and technically simple manner, and which system is constructed in a precise, non-destructive and technically simple manner.

A first aspect of the disclosure proposes a method for determining a distance between a first component and a second component. The method has the steps of providing at least one first conductive section in or on the first component in a region directed toward the second component; providing at least one second conductive section in or on the second component in a region directed toward the first conductive section; feeding a first voltage pulse into a first connection of the first conductive section; simultaneously and/or directly subsequently capturing a reflection voltage pulse in response to the first voltage pulse at the first connection; determining an impedance profile along the at least one first conductive section by evaluating the reflection voltage pulse; and determining at least one distance between the first component and the second component along the at least one first conductive section by calculating at least one corresponding local distance, associated with the determined impedance profile, between the at least one first conductive section and the at least one second conductive section.

The aim of the method is to determine the distance between two components to be adhesively bonded to one another in a non-destructive and precise manner without impairing the components. In particular, an aim of the method is also to determine a plurality of distances along the at least one first conductive section, in which case a plurality of measurements are not necessarily required for this purpose. This is enabled by using a time domain reflectometry method which makes it possible to directly analyze the signal transmission along a conductor track or the like, which is influenced by material properties and boundary conditions, by determining its characteristic impedance.

The first voltage pulse can be generated, in particular, by means of a square-wave pulse. A voltage is consequently applied to the first connection of the first conductive section over a very short period which may be in the range of nanoseconds, which voltage propagates as a pulse along the first conductive section. The first voltage pulse can be provided by a signal generator, for instance, and should have a very steep rise and fall as far as possible. The square-wave pulse may be in the form of a short square-wave pulse, but this is not necessary. It may also be useful to carry out a voltage jump in the method and to allow the voltage to be applied until all reflections have been recorded.

The first voltage pulse can lose energy during its propagation and will be reflected overall depending on the electrical properties of an outer end of the first conductive section. Discontinuities along the first conductive section likewise result in partial reflection of the first voltage pulse. Overall, this results in the reflection voltage pulse which can be measured again at the first connection.

In this context, a discontinuity is a designation for a geometric feature which changes locally in the arrangement of two components under consideration. This may take place, for instance, as a result of a change in a local distance between the components, the presence of a gap in one of the components, the presence or absence of an adhesive between the components or else the presence of a mechanical joining means.

As a result of this reflection voltage pulse being simultaneously or directly subsequently captured in response to the first voltage pulse, a temporal profile in the form of a graph or a sequence of curve points of the received reflection voltage point can be recorded and examined in order to make a statement on the state of the first conductive region or the two components.

In this case, discontinuities along the first conductive section can be very easily isolated from the reflection voltage pulse in a spatially resolved manner for closer consideration. Any change in the electrical properties along the first conductive section influences the temporal profile of the reflection voltage pulse. Both the position and the type of any discontinuity can consequently be conversely determined therefrom, whether it be a change in the inductance, the capacitance or the resistance. The considerations of the inductance and the capacitance, in particular, which depend on the material of the two components, the distance between them and the material between the two components, may be decisive for the method according to the disclosure. In principle, the reflection voltage pulse which is output as a function of the transit time and can therefore be represented in a spatially resolved manner is a function of the geometry of the first conductive section and of the dielectric situated between the first conductive section and the second conductive section. Consequently, the gap thickness or the distance between the first conductive section and the second conductive section can be represented in a spatially resolved manner over the transit time, that is to say the length of the at least one first conductive section, by evaluating the reflection voltage pulse.

Depending on the type and state of the components examined, discontinuities can be identified from the reflection voltage pulse as characteristic local, minor changes in the curve profile. An exact position of such a discontinuity can be determined taking into account a propagation speed known for the first conductive section: the first voltage pulse which propagates from the first connection to the relevant discontinuity is partially reflected there and the reflected portion runs back to the first connection at the same speed, but in an opposite propagation direction. The distance between the first connection and the relevant discontinuity is consequently the section passed through in half the transit time between the introduction of the first voltage pulse and the signal reflected at this discontinuity and running back to the first connection. Very good isolation of corresponding features from the temporal profile of a reflection voltage pulse is possible, especially in the case of larger components, in particular fuselage or tail unit parts of a passenger aircraft.

In order to calculate local distances between the first and second components from the reflection voltage pulse, an impedance profile can be calculated according to methods which are conventional in the art. As described above, the distance can be determined in a spatially resolved manner from the impedance profile. It is preferred if a voltage pulse is introduced only at the first conductive section in order to ground the second conductive section.

The operation of providing the at least one first conductive section or the operation of providing the at least one second conductive section in or on the relevant component can be implemented in various ways. In addition to completely integrating such a conductive section in the form of a separate conductor track in the relevant component, it is conceivable to introduce metallic or other conductive particles or to apply a separate conductor track or the like. Furthermore, the respective component itself may also be conductive at least in sections and can consequently fully undertake the function of the relevant conductive section.

The relevant conductive section should have a connection which can be used to introduce the first voltage pulse. The connection should be configured so precisely that its electrical behavior can be clearly predicted and the measurement is not distorted. In particular, the extent of the relevant connection should have a length which is as short as possible and should be connected via a coaxial cable or the like as far as possible, which reduces the influence of interfering factors. The relevant connection can be permanent or removable.

On account of the spatially resolved determination of the distance, it is possible to make a statement on the positioning of the components with respect to one another. It is possible to analyze not only the correct placement, but also the correct placement of the components adhesively bonded to one another and a sufficient adhesive layer thickness and wetting.

In one advantageous embodiment, a distance between the first component and the second component, which corresponds to a local adhesive thickness, is calculated from the distance between the first conductive section and the second conductive section. Depending on the design of the conductive sections in the relevant components, the distance between the conductive sections and the actual distance between the components may differ from one another. In order to obtain precise distance values, it is consequently necessary to calculate the distance on the basis of the installation conditions of the conductive sections.

The method may also comprise the step of examining the determined impedance profile for any adhesive defects between the first component and the second component. As explained above, the reflection voltage pulse or the impedance profile obtained therefrom is characteristic of the electrical properties and the influence of the dielectric between the components. Since the impedance profile, as explained above, is also determined by the dielectric properties between the first conductive section and the second conductive section, jumps in the local impedance at locations at which an associated geometric feature which could result in this jump should not be present can indicate adhesive defects.

In one advantageous embodiment, the calculation of the distance comprises comparing the determined impedance profile with a desired impedance profile. For the particularly simple analysis of a spatially resolved distance between the components, it is conceivable to determine a type of reference curve for the impedance profile and to use this as a comparison basis for determining the distance. It may be advantageous to analyze more precisely points of a determined impedance profile which prove to be unusual after the comparison with the reference curve.

In a further advantageous embodiment, the provision of the at least one first conductive section comprises arranging a first electrode on the first component, wherein the first component is conductive at least in a region comprising the first conductive section. In order to ensure the function, one of the components may include a metallic material or may comprise a metallic part at a suitable location over a considerable extent of the component, for instance. Alternatively or additionally, one of the components may also include a fiber composite material which has conductive fibers or is supplemented with conductive fibers in certain regions.

Furthermore, the provision of the at least one first conductive section can also comprise arranging a separate first conductor track on or in the first component. The separate first conductor track could be used in the form of metallic particles which are either directly applied to or laminated into the component or are arranged on a plastic film as the carrier, for example.

The provision of the at least one second conductive section may likewise comprise arranging a second electrode on the second component, wherein the second component is conductive at least in a region comprising the second conductive section. The provision of the at least one second conductive section may likewise comprise arranging a separate, second conductor track on or in the second component.

The provision of the at least one first or second conductive section may comprise applying a conductor track to the relevant component. In particular, a metallic film, optionally on a carrier film, could lend itself to this purpose.

In order to extend the measuring field transversely to the actual extent of the respective conductive section, a plurality of first and second conductive sections can also be provided and preferably run parallel to one another. A plurality of first conductive sections can be used to determine an impedance profile in succession or else at the same time in the case of sufficient spatial separation. In the case of large-sized components, a plurality of elongated regions, in particular, can be examined for a distance to the relevant other component.

It goes without saying that it is also possible to examine two first conductive sections of the first component with the aid of a differential measuring method. In this case, first voltage pulses which are opposite one another are introduced into both first conductive sections and the reflection voltage pulses are recorded and measured at at least one of the two first conductive sections. It is clear that, despite the lack of an electrical connection, the two first conductive sections considerably influence one another as a result of electromagnetic effects, in particular if the at least one second conductive section or the second component is grounded. The use of the differential measuring method makes it possible both to check the distances between two first conductive sections and to determine the distance to the conductive second section.

As stated above, the separate conductor track can be arranged on a film made of plastic and, in particular, thermoplastic material as the carrier material. The plastic may be in the form of polyetherimide since this material allows a particularly good join to a resin for embedding the film.

The film can also be arranged at one end of an overlapping region of the first component and the second component. A relatively high mechanical stress can be present there in comparison with adjacent regions of the components and of the adhesive layer, with the result that the integration of the conductive sections there appears to be most useful. So that the sensors do not weaken the structure in this critical region, they can have a very narrow design or can be embedded in a depression.

In order to carry out a functional test, it is advantageous if distances of at least one pair of first and/or second conductive sections are determined and are compared with predefined distances. If a conductive section has been detached or shifted from the relevant component, for instance, this can be detected with the aid of the self-test. Constant distances should be expected between conductive sections arranged parallel to one another. However, if measuring operations at conductive sections adjacent to one another in pairs result in unreasonable results during a distance measurement, this could indicate a fault in the relevant conductive section.

A differential measuring method in which a first voltage pulse and a second voltage pulse, which are opposed to one another, are respectively introduced into a first conductive section and into a second conductive section is particularly suitable for such a self-test.

The method according to the disclosure may thus also comprise the step of introducing a second voltage pulse into the at least one second conductive section of the second component, wherein the second voltage pulse is introduced at the same time as the first voltage pulse, and wherein the second voltage pulse has an opposite polarity to the first voltage pulse. This could also be referred to as an inverse voltage pulse.

The disclosure also relates to the use of a time domain reflectometry method for determining a distance between a first component and a second component to be adhesively bonded to one another, wherein a first conductive region on the first component and a second conductive region on the second component are provided for the purpose of introducing a first voltage pulse and capturing a reflection voltage pulse, and wherein an impedance profile characterizing a distance between the first component and the second component is determined by evaluating the reflection voltage pulse.

Finally, the disclosure relates to an electronic unit for determining a distance between a first component and a second component, wherein the electronic unit has a signal generator, a computing unit and at least one first connector, wherein the electronic unit is set up to introduce a first voltage pulse into a first connection of a first conductive section of a first component with the aid of the signal generator, to simultaneously and/or directly subsequently capture a reflection voltage pulse in response to the first voltage pulse at the first connection, to determine an impedance profile along the at least one first conductive section with the aid of the computing unit by evaluating the reflection voltage pulse, and to determine at least one distance between the first component and the second component along the at least one first conductive section by calculating at least one corresponding local distance, associated with the determined impedance profile, between the at least one first conductive section and the at least one second conductive section.

The electronic unit may also have at least one second connector, wherein the electronic unit is set up to introduce a second voltage pulse into a second conductive section of a second component via the at least one second connector using the signal generator, which second voltage pulse is inverse to the first voltage pulse. This enables a differential reflectometry method in which any interfering influences are canceled by the external connection or external influences.

BRIEF DESCRIPTION OF THE FIGURES

Further features, advantages and possible uses emerge from the following description of the exemplary embodiments and the figures. In this case, all features described and/or illustrated in the figures form the subject matter of the disclosure alone and in any desired combination even irrespective of their composition in the individual claims or their dependency references. In the figures, the same reference symbols still represent identical or similar objects.

DETAILED DESCRIPTION OF EXEMPLARY EMBODIMENTS

Figure 1:
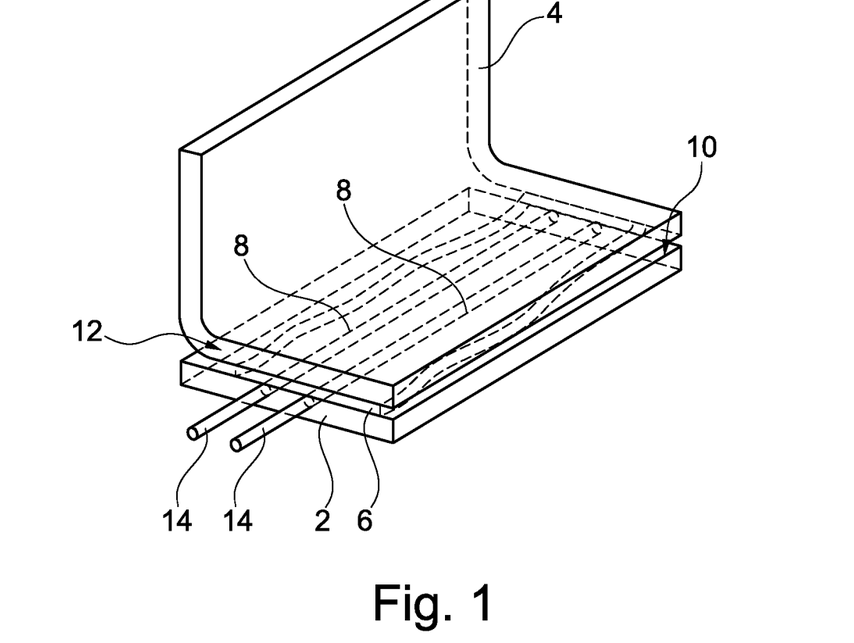
FIG. 1 schematically shows a first component, a second component and an adhesive layer in between with indicated first conductive sections and associated connections.

FIG. 1 schematically shows a first component 2 and a second component 4 which are joined to one another by means of a layer 6 of a cohesive joining means. The first component 2 has two first conductive sections 8 which are arranged parallel to one another close to a surface 10 of the first component 2 and are directed toward the second component 4. For example, the second component 4 is conductive per se, with the result that the second conductive section is only schematically illustrated with the reference symbol 12. It should be mentioned in this illustration that the second component 4 or the second conductive section 12 is grounded.

The first conductive sections 8 each have a first connection 14 which can be connected to an electronic unit (not shown here). In this illustration, the adhesive layer 10 has a particular constant desired thickness which needs to be checked. For this purpose, an impedance along the combination of the first conductive sections 8 is determined with the aid of the first conductive section 8 on the basis of the time domain reflectometry method, a distance profile between the first component 2 and the second component 4 being able to be calculated from the profile of said impedance. The impedance when using the differential method can be referred to as the differential impedance. An impedance profile determined using this method can also reveal, in particular by virtue of erratic profile shapes, that the adhesive layer has defects or thickness changes or jumps.

Figure 2:
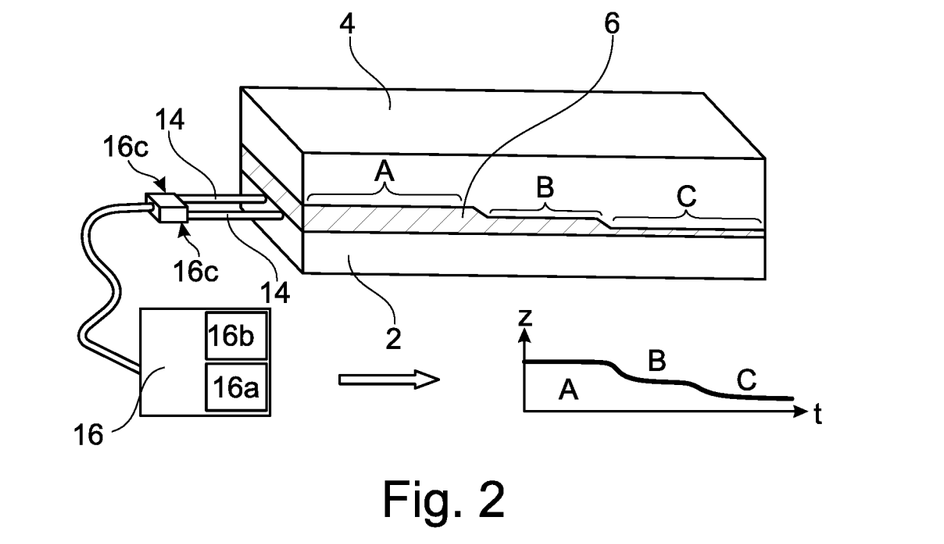
FIG. 2 shows the illustration from FIG. 1 together with an electronic unit for carrying out the method according to an embodiment of the invention.

FIG. 2 schematically shows a similar illustration of a first component 2, a second component 4 and an adhesive layer 6 in between which does not have a constant thickness. In this case too, two first conductive sections are provided (concealed) and are joined, via the connections 14, to an electronic unit 16 via the respective first connection 14 and a connector 16c of the electronic unit 16. It is therefore possible to carry out a differential time domain reflectometry method in order to determine the profile of the thickness of the adhesive layer 6. For this purpose, the electronic unit 16 has a signal generator 16a and a computing unit 16b, for example.

In the example shown, the second component 4 is likewise conductive and can be grounded while carrying out the method. The adhesive layer schematically illustrated in a stepped manner results in a reflection signal which is characteristic of the configuration of the adhesive layer or the relative positions of the two components with respect to one another. The reflection voltage pulse can be used to determine the (differential) impedance, the temporal profile of which is shown below the first component 2. In this case, it is possible to see a plurality of fairly constant regions A, B and C which can be assigned to the corresponding regions A, B and C each with a constant adhesive thickness.

Figures 3A, 3B, 3C, 3D:
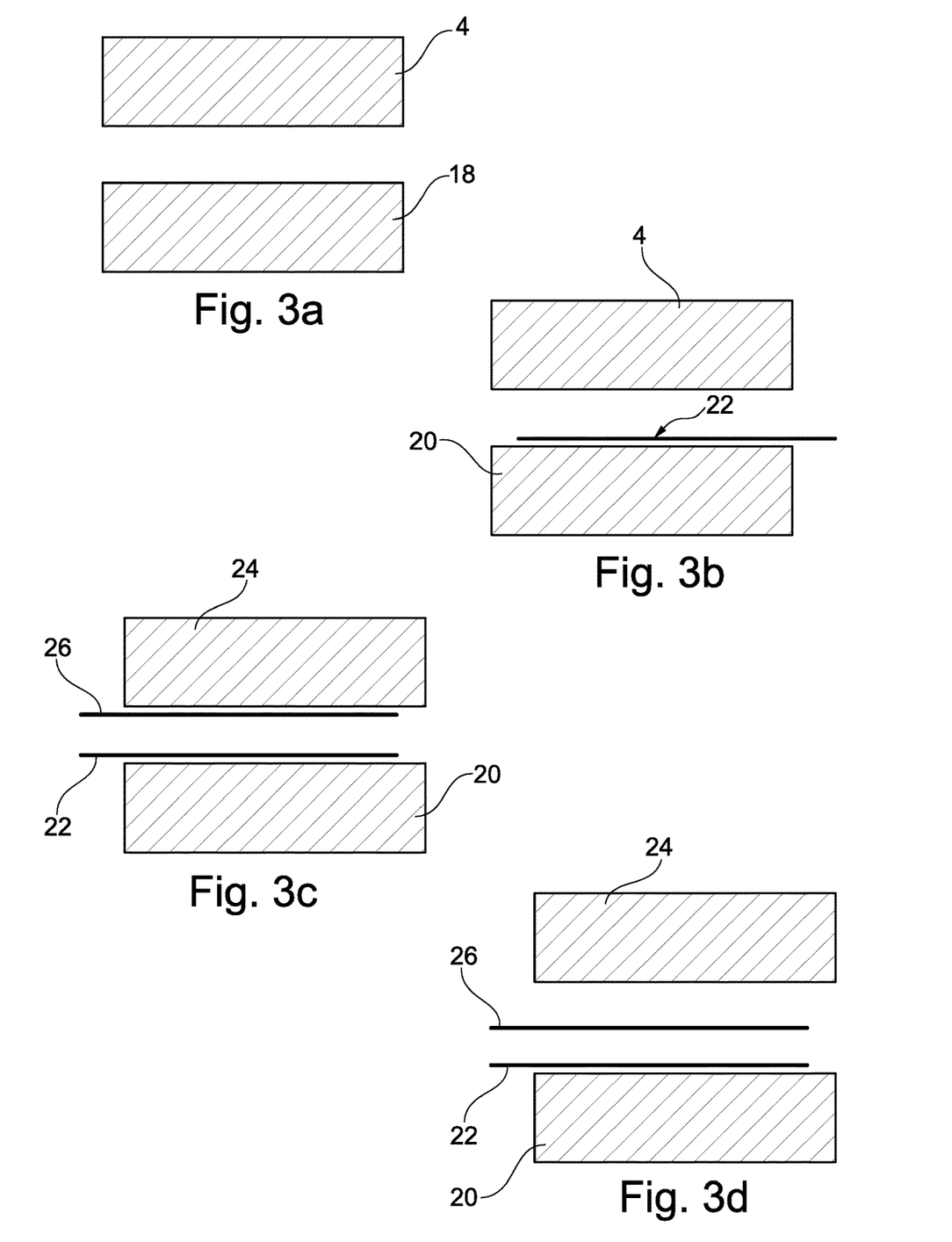
FIGS. 3a to 3d show different configurations and arrangements of conductive sections.

It goes without saying that the method can also be carried out with different configurations of conductive sections. FIGS. 3a, 3b, 3c show different embodiments only by way of example.

In FIG. 3a, a first component 18 and a second component 4 are sufficiently electrically conductive or form the basis for the method according to the disclosure by locally increasing the conductivity, for instance by introducing metallic particles.

FIG. 3b schematically illustrates a second component 4 with sufficient conductivity, wherein a first component 20 has a separate conductor track 22 as a first conductive section.

In FIG. 3c, a second component 24 with a separate conductor track 26 as a second conductive section and the first component 20 with the separate conductor track 22 from FIG. 3b are combined with one another. For example, when adhesively bonding fiber composite materials or other non-conductive parts to metallic materials, the conductivity of the metal makes it possible to make direct contact with the latter, for instance as ground. As a result, it would be possible to dispense with the application of a conductor track to the metallic structure.

FIG. 3d shows the variant from FIG. 3c in which the separate conductor track 26 has been detached. This is relevant to the subsequent description of a self-test according to FIGS. 5a and 5b.

The variants in which conductor tracks could be deliberately configured with different regions of different widths are not illustrated. However, said conductor tracks are preferably equipped with a constant width in the case of simple components. Alternatively or additionally, the conductor tracks can also be constructed from a plurality of layers, wherein electrically conductive and insulating layers alternate in order to produce a shielding layer between carbon fibers of the part and the active conductor track, for example.

Figure 4:
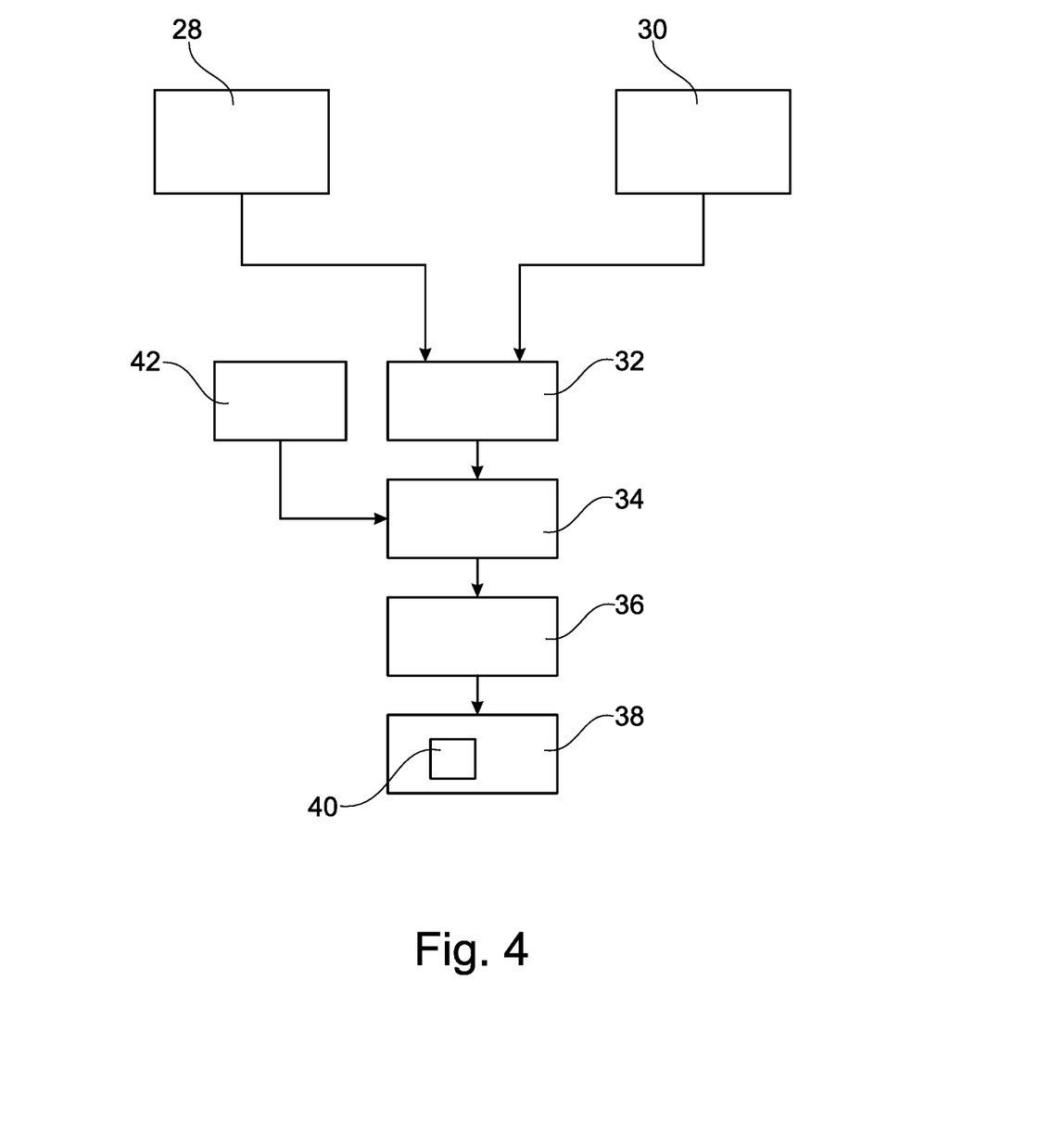
FIG. 4 schematically shows a flowchart of a method according to an embodiment of the invention.

FIG. 4 uses a block diagram to schematically show a course of the method according to an embodiment of the invention. The method for determining a distance between a first component and a second component is illustrated, which method has the steps of providing 28 at least one first conductive section in or on the first component in a region directed toward the second component, providing 30 at least one second conductive section in or on the second component in a region directed toward the first conductive section, feeding 32 a first voltage pulse into a first connection of the first conductive section, simultaneously and/or directly subsequently capturing 34 a reflection voltage pulse in response to the first voltage pulse at the first connection, determining 36 an impedance profile along the at least one first conductive section by evaluating the reflection voltage pulse, and determining 38 at least one distance between the first component and the second component along the at least one first conductive section by calculating 40 at least one corresponding local distance, associated with the determined impedance profile, between the at least one first conductive section and the at least one second conductive section. As mentioned above, the method may also have the step of introducing 42 a second voltage pulse into the at least one second conductive section of the second component, wherein the second voltage pulse is introduced at the same time as the first voltage pulse, and wherein the second voltage pulse runs inversely to the first voltage pulse.

Figure 5A:
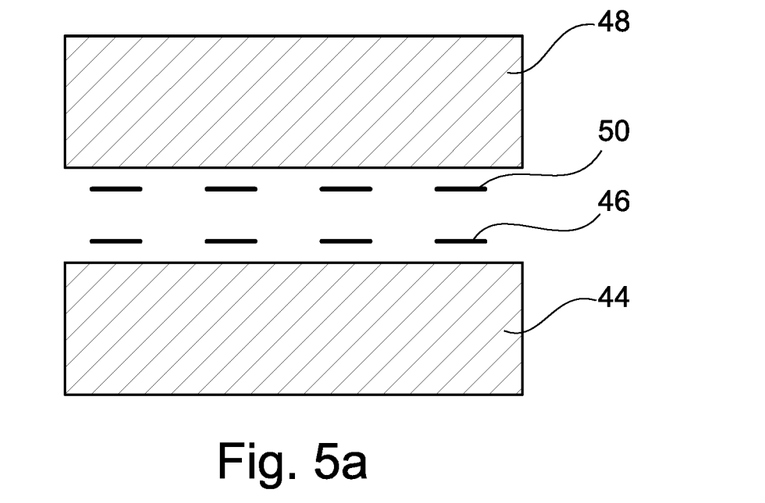
FIGS. 5a and 5b show a plurality of conductive sections on each component.

FIG. 5a shows a possible configuration of the first and second conductive sections 46 and 50 on a first component 44 and a second component 48 for the purpose of capturing a measuring field which is as large as possible, which sections are also suitable for carrying out a self-test. For this purpose, a plurality of parallel conductor tracks 46 are used as first conductive sections and a plurality of parallel conductor tracks 50 are used as second conductive sections, between which the respective distance is measured in pairs by means of coupling in pairs for a differential time domain reflectometry method. This is illustrated by an indication using double-headed arrows in FIG. 5b.

Figure 5B:
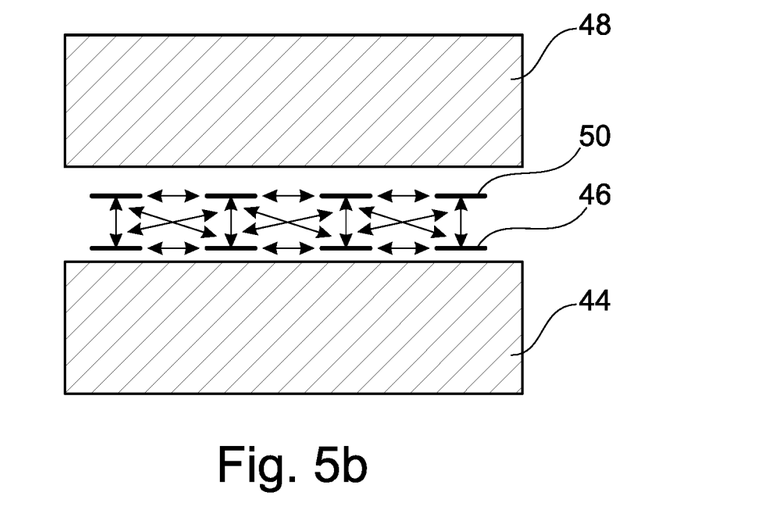

The fault detection is very reliable, in particular, when the conductor tracks 46 and 50 are not applied to a common carrier, but rather are actually implemented as separate sensor strips. The individual measurements are very fast on account of the very short pulse durations and the fast propagation along the conductive sections 46 and 50. Faults in the arrangement of the conductor tracks 46 and 50 and then during the actual measurement of an adhesive thickness can be identified very easily on the basis of the different distance measurements by means of corresponding data processing. This can also be carried out, in particular, by taking into account the geometry data of the parts during data processing or else by means of calibration measurements after the individual conductor tracks have been applied and also after the adhesive has been applied and the parts have been joined.

Figure 6A:
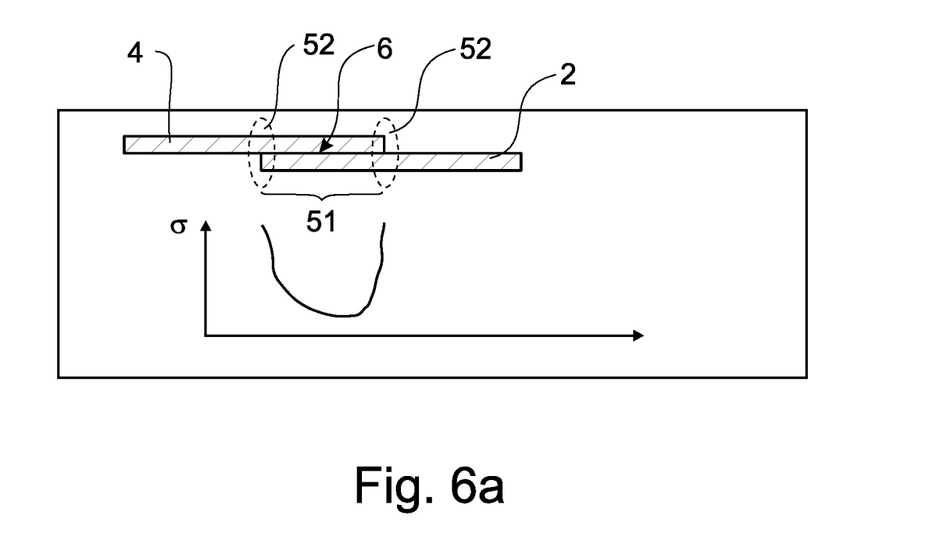
FIGS. 6a and 6b show a load diagram of overlapping adhesive bonding (6a) and the arrangement of a conductive section on a film at the edge of an overlap.

FIG. 6a shows an overlap 51 of adhesive bonding of the first component 2 to the second component 4 via an adhesive layer 6. Ends 52 of the overlapping region 51 can have the highest mechanical load, as indicated in the schematic load diagram underneath. The arrangement of conductive sections at these ends 52 would therefore be very useful. In order to mechanically impair these regions as little as possible, the conductive sections should be as narrow as possible or should be moved somewhat further into the overlapping region 51. If a plurality of measuring points are arranged along the overlapping region 51, the adhesive thickness in the edge regions can be inferred by means of extrapolation.

Figure 6B:
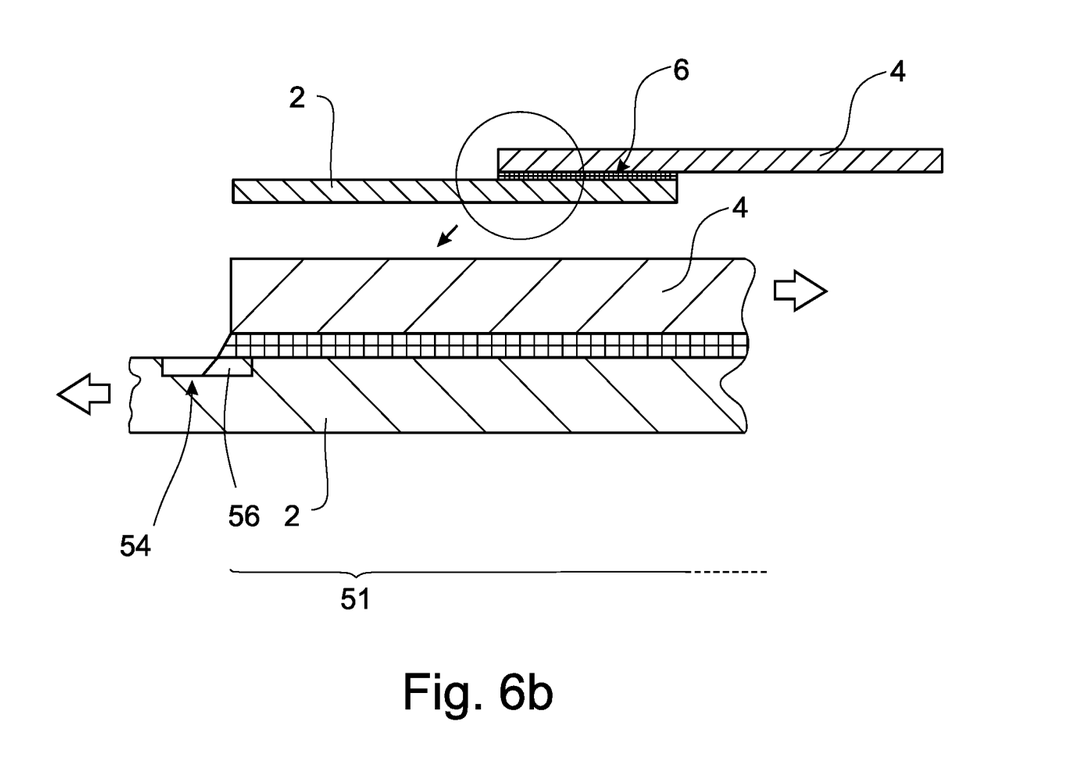

FIG. 6b finally illustrates a modification in which the first component, for example, has a depression 54 with a film 56 which is situated in the latter and extends outward from an overlapping region 51. For example, the first component 2 can be produced from a carbon fiber reinforced plastic. Integrating the film 56 makes it possible to reduce the shearing angle, in the case of which the load profile from FIG. 6a is somewhat weakened at the edge regions and ensures that forces are eased in the region of the film 56. This film 56 can be provided with a conductive section in the sense of the disclosure.

It should be additionally pointed out that "having" does not exclude any other elements or steps and "a", "an" or "one" does not exclude a multiplicity. It should also be pointed out that features which have been described with reference to one of the exemplary embodiments above can also be used in combination with other features of other exemplary embodiments described above. Reference symbols in the claims should not be considered to be a restriction.

The invention claimed is:

1. A method for determining a distance between a first component and a second component, comprising the steps of:
   providing a first conductive section in or on the first component in a region directed toward the second component,
   providing a second conductive section in or on the second component in a region directed toward the first conductive section,
   feeding a first voltage pulse into a first connection of the first conductive section,
   simultaneously and/or directly subsequently capturing a reflection voltage pulse in response to the first voltage pulse at the first connection,
   determining an impedance profile along the first conductive section by evaluating the reflection voltage pulse, and
   determining a plurality of distances between the first component and the second component along the first conductive section by calculating a plurality of corresponding local distances, associated with the determined impedance profile, between the first conductive section and the second conductive section.

2. The method as claim in claim 1,
   wherein a distance between the first component and the second component, which corresponds to a local adhesive thickness, is calculated from the distance between the first conductive section and the second conductive section.

3. The method as claimed in claim 1, further comprising the step of examining the determined impedance profile for any adhesive defects between the first component and the second component.

4. The method as claimed in claim 1,
   wherein the calculation of the distance comprises comparing the determined impedance profile with a desired impedance profile.

5. The method as claimed in claim 1,
   wherein the providing of the first conductive section and the second conductive section comprises arranging an electrode on a relevant one of the first or second component, wherein the relevant component is conductive at least in a region comprising a relevant one of the first or second conductive section.

6. The method as claimed in claim 1,
   wherein the providing of the first conductive section and the second conductive section comprises arranging a separate conductor track on, at or in a relevant one of the first or second component.

7. The method as claimed in claim 6,
   wherein the separate conductor track is arranged on a film made of thermoplastic material as the carrier material.

8. The method as claimed in claim 7,
   wherein the thermoplastic material is polyetherimide.

9. The method as claimed in claim 7,
   wherein the film is arranged at one end of an overlapping region of the first component and the second component.

10. The method as claimed in claim 1,
    further comprising the step of introducing a second voltage pulse into the second conductive section of the second component, wherein the second voltage pulse is introduced at the same time as the first voltage pulse, and wherein the second voltage pulse has an opposite polarity to the first voltage pulse.

11. The method as claimed in claim 1, wherein a plurality of first conductive sections and/or second conductive sections are provided and each run parallel to one another.

12. The method as claimed in claim 11, wherein, in order to carry out a functional test, distances of at least one pair of first conductive sections and/or second conductive sections are determined and are compared with predefined distances.

13. An electronic unit for determining a distance between a first component and a second component, the electronic unit comprising:
    a signal generator;
    a computing unit; and
    at least one first connector;
    wherein the electronic unit is configured to introduce a first voltage pulse into a first connection of a first conductive section of the first component with the aid of the signal generator, to simultaneously and/or directly subsequently capture a reflection voltage pulse in response to the first voltage pulse at the first connection, to determine an impedance profile along the at least one first conductive section with the aid of the computing unit by evaluating the reflection voltage pulse, and to determine a plurality of distances between the first component and the second component along the first conductive section by calculating a plurality of corresponding local distances, associated with the determined impedance profile, between the first conductive section and a second conductive section of the second component.

14. The electronic unit as claimed in claim 13, further comprising at least one second connector, wherein the electronic unit is configured to introduce a second voltage pulse into the second conductive section of the second component via the at least one second connector using the signal generator, wherein the second voltage pulse has an opposite polarity to the first voltage pulse.

* * * * *